(12) United States Patent
Koponen et al.

(10) Patent No.: US 7,886,052 B2
(45) Date of Patent: Feb. 8, 2011

(54) CAPABILITY BROKER AND MESSAGING SYSTEM

(75) Inventors: Juha Koponen, Espoo (FI); Sami Katainen, Vantaa (FI); Mikko Kestilä, Espoo (FI); Juha Larjomaa, Helsinki (FI)

(73) Assignee: Airwide Solutions Oy, Espoo (FI)

( * ) Notice: Subject to any disclaimer, the term of this patent is extended or adjusted under 35 U.S.C. 154(b) by 164 days.

(21) Appl. No.: 12/299,176

(22) PCT Filed: Apr. 30, 2007

(86) PCT No.: PCT/FI2007/050240
§ 371 (c)(1),
(2), (4) Date: Feb. 15, 2009

(87) PCT Pub. No.: WO2007/125179
PCT Pub. Date: Nov. 8, 2007

(65) Prior Publication Data
US 2009/0187633 A1    Jul. 23, 2009

(30) Foreign Application Priority Data
May 2, 2006    (FI)    ................... 20060425

(51) Int. Cl.
*G06F 15/173* (2006.01)
(52) U.S. Cl. .................................... 709/225
(58) Field of Classification Search .................. 709/225
See application file for complete search history.

(56) References Cited

U.S. PATENT DOCUMENTS

| | | | |
|---|---|---|---|
| 7,254,645 B2* | 8/2007 | Nishi | 709/249 |
| 7,343,428 B2* | 3/2008 | Fletcher et al. | 709/250 |
| 7,458,084 B2* | 11/2008 | Zhang et al. | 719/328 |
| 7,496,762 B1* | 2/2009 | Boydstun et al. | 713/182 |
| 7,529,833 B2* | 5/2009 | Cai et al. | 709/225 |
| 2003/0220880 A1* | 11/2003 | Lao et al. | 705/51 |
| 2004/0002936 A1 | 1/2004 | Majumder et al. | |
| 2004/0215711 A1 | 10/2004 | Martin, Jr. et al. | |
| 2005/0015340 A1 | 1/2005 | Maes | |

(Continued)

FOREIGN PATENT DOCUMENTS

WO    WO 02/059788 A1    8/2002

(Continued)

OTHER PUBLICATIONS

Clemo, G. et al. the use service discovery to support reconfigurable terminals', Vehicular Technology Conference, 2001(VTC 2001 IEEE VTS 53rd) Proc. 2001 vol. 4 pp. 2465-2469 vol. 4 ISBN: 0-7803-6728-6.

*Primary Examiner*—J Bret Dennison
(74) *Attorney, Agent, or Firm*—Shalom Wertsberger; Saltamar Innovations

(57) ABSTRACT

Disclosed are a capability broker, a related messaging system and methods. The capability broker is placed in new network architecture between traffic proxies and enabler servers. The capability broker is equipped with a capability interface adapted to receive a capability request pertaining to a request of at least one capability. The capability broker is adapted to use one or more messages to obtain the requested at least one capability from one or more enabler servers responsive to receiving said capability request, and to provide a response to said capability request on the basis of the obtained capability.

38 Claims, 5 Drawing Sheets

U.S. PATENT DOCUMENTS

| | | | |
|---|---|---|---|
| 2005/0138187 A1* | 6/2005 | Breiter et al. | 709/229 |
| 2006/0117109 A1 | 6/2006 | Maes | |
| 2007/0011281 A1* | 1/2007 | Jhoney et al. | 709/220 |
| 2008/0065402 A1* | 3/2008 | Sanamrad | 705/1 |

FOREIGN PATENT DOCUMENTS

| | | |
|---|---|---|
| WO | WO 02/067156 A1 | 8/2002 |
| WO | WO 2007/125179 A1 | 11/2007 |

* cited by examiner

CAPABILITY BROKER AND MESSAGING SYSTEM

FIELD OF THE INVENTION

The invention generally relates to content messages, traffic proxies distributing the content messages to terminals, and to enabler servers supporting value-added services of service providers. The invention especially, but not exclusively, relates to direct-to-consumer content services, context aware services, and arrangements supporting these services.

BACKGROUND OF THE INVENTION

Many operators have turned their focus on direct-to-consumer (D2C) content services. This is the result of the fact that most of the operators' revenues of value-added services (VAS) are obtained from off-portals providing direct-to-consumer content. The off-portals are portals which are owned by third parties.

On the other hand, the operators have limited possibilities to utilize the VAS market separated from their standard data rates and services. The operators have in their communications networks all the capabilities relating to billing, subscriber identity, subscriber location, authentication data, and presence data which enable innovative third parties to design truly new services. The capabilities are offered by various servers, called herein as enabler servers. Therefore, offering the capabilities to the third parties interest the operators, but the communications networks and their capabilities are usually made for one user only, i.e. sharing the capabilities is very difficult.

A lack of appropriate capabilities is a problem especially when designing context aware services. A service whose operation is essentially dependent on a customer's presence, his/her location, and/or resources locating near the customer is termed a context aware service.

FIG. 1A shows an example of network architecture. In more detail, the example concerns the network of a communications network operator and the architecture of the network. We may assume that the network transmits IP packets. The network comprises four traffic proxies: a message router 101, a HTTP proxy 102, a download center 103, and a steaming proxy 104, as well as five enabler servers: a billing center 105, a presence server 106, an authentication server 107, a terminal system 108, and a network information system 109.

The terminal system 108 includes information about terminals such as terminal types. For example, the terminal system 108 discloses, whether a terminal is capable to receive MMS messages or multimedia streams. The terminal system 108 may include a proxy to a HLR (Home Location Register). Then terminal system 108 also discloses whether a terminal is located outside of its home network, i.e. the terminal is roaming.

The network information system 109 includes information about the communications network administrated by an operator. This information discloses, for example, whether the communications network is capable to transmit MMS messages or GPRS data. Specifically, the information determines with which network a terminal is currently connected. As an example, the terminal may be connected with a 2G, 2.5G, 3G, WLAN, or HSDPA network, or some other network. The network information system 109 may also include information about the actual available bit rate for the terminal at the current moment.

Each traffic proxy 101-104 communicates with each enabler server 105-109, which is illustrated in FIG. 1A by lines. The communication is message-based. Each enabler server offers an interface through which the information contained in the enabler server can be accessed. Each traffic proxy needs to know the interface offered by each enabler server. Because there are twenty lines illustrating the communication, there are in total twenty places where information about the interfaces needs to be maintained in order to enable communication between the traffic proxies 101-104 and the enabler servers 105-109.

Let us assume that the operator of the communications network is willing to open its network to service providers 110 so that the service providers 110 can use the operator's network in their business. Then the service providers need some sort of service interface to perform actions in the operator's network. As an example, an action may be sending MMS messages from the message router 101 to the customers of a content provider. In FIG. 1A the service providers have a service interface to the billing center 105, the presence server 106, and to the authentication server 107, i.e. there are three different service interfaces.

A first problem of the prior art is inherent in the architecture of an operator's network. In more detail, the first problem concerns the great number of interfaces. The great number of the interfaces and various details related to the interfaces make the use of the operator's network complicated. The great number of interfaces also causes that maintainability of the network may be poor. Let us assume that the billing center 105 shown in FIG. 1A is replaced with a new one which essentially differs from the original billing center. Because of these differences it may be that all four traffic proxies, the message router 101, the HTTP proxy 102, the download center 103, and the streaming proxy 104, need to be adapted to a new interface of the billing center 105.

A second problem of the prior art is lack of control means by which the operator of a communications network is able to control how the traffic proxies use capabilities offered by the enabler servers.

A third problem of the prior art is diversity of terminal types and network types. Let us assume that all customers have GMS phones without any multimedia messaging features. It is simple for a content provider to send SMS messages to the customers. Then let us assume that some customers have GMS phones capable to receive only SMS messages and some other customers have phones which are capable to receive MMS messages. We may also assume that there is a third group of customers who have IP phones capable to receive certain types of multimedia messages and/or multimedia streams. Now the content provider should send its content messages to two different types of communications networks and to three different types of terminals. The known messaging systems support badly content providers in message distribution to various types of terminals and/or various types of networks.

SUMMARY OF THE INVENTION

One object of some embodiments of the invention is to solve or alleviate the above-mention problems of the prior art.

Another object of some embodiments of the invention is to design a new network architecture that supports offering the capabilities of a communications network operator to third parties.

Still another object of some embodiments of the invention is to transform a single-user system including a network and capabilities to a multi-user system that is simultaneously intended for service providers representing third parties and other service providers that represent the operator.

Content providers, aggregators managing third parties on behalf of an operator and operating between the operator and the third parties, and mobile virtual network operators (MVNOs) are some examples of service providers.

An aspect of the invention provides a capability broker and another aspect of the invention provides a messaging system. Both of them can be used in various types of services.

According to a first aspect of the invention there is provided a capability broker for providing capabilities of an operator of a communications network, said capabilities being situated in enabler servers in the operator's network. The capability broker comprises memory capacity, processor capacity, an administrator interface through which an administrator of the capability broker is able to grant capabilities to a certain service provider, the administrator of the capability broker being nominated by the operator, and a capability interface adapted to receive a capability request pertaining to a request of at least one capability, the processor capacity being adapted to use one or more messages to obtain the requested at least one capability from one or more enabler servers responsive to receiving said capability request, and to provide a response to said capability request on the basis of the obtained capability.

The capability interface may be adapted to handle IMS (IP Multimedia Subsystem)-based communications. The granted capabilities may enable forming of messages and/or sending of the messages.

In an embodiment of the invention the administrator interface is equipped with adjustment means by which the administrator of the capability broker is able to adjust the capabilities granted to the service provider. The adjustment means may be adapted to deny access to certain customer-specific information and/or to create a customer profile that discloses which item(s) of the customer-specific information a certain service provider is able to obtain. The customer profile may disclose time-based limitations related to use of said item(s) of information and/or other types of limitations.

In an embodiment of the invention the capability broker further comprises a service interface adapted to receive a capability request pertaining to a request of at least one capability.

The capability request may be a batch query which serves in one batch a number of customers and/or a consolidated query concerning use of a number of capabilities.

In an embodiment of the invention the capability broker is further adapted to map the received capability request to said one or more messages used to obtain the capability from said one or more enabler servers. This mapping may be conducted in a request mapper. The request mapper may be adapted to operate as a programming tool by means of which the service provider is able to implement a new service.

In an embodiment of the invention the capability broker further comprises a traffic controller which is adapted to control a number of capability requests, and/or to control a number of the messages used to obtain capabilities from said one or more enabler servers.

The traffic controller may be adapted to set a price for a certain type of capability request and/or to set at least one throttle to limit the capability requests. Additionally or alternatively the traffic controller may be adapted to write a transaction log and possibly also to read the transaction log in order to make statistics about the capability requests.

In an embodiment of the invention the capability broker is further adapted to receive a request for a distribution list of terminals fulfilling certain criteria, to access one or more enabler servers to find out which terminals fulfil said criteria, and to form the requested distribution list.

In a further embodiment of the invention a distribution request specifies a preliminary distribution list containing mobile phone numbers, and the capability broker is further adapted to remove from the preliminary distribution list such mobile phone numbers which are as yet possessed by no subscriber, and remove from the preliminary distribution list such mobile phone numbers which are possesses by subscribers currently roaming.

The capability broker may be further adapted to add customer context information to the distribution list.

According to a second aspect of the invention there is provided a method for providing capabilities of an operator of a communications network, said capabilities being situated in enabler servers in the operator's network. The method comprises allowing an administrator to grant capabilities to a certain service provider, the administrator being nominated by the operator, and receiving a capability request pertaining to a request of at least one capability, responsive to receiving said capability request, using one or more messages to obtain the requested at least one capability from one or more enabler servers, and providing a response to said capability request on the basis of the obtained capability.

According to a third aspect of the invention there is provided a memory medium comprising computer executable program code adapted to enable an apparatus to perform the method according to the second aspect or according to one of the related embodiments.

The capability broker of various embodiments of the invention may be a server or another type of component that is placed in a new network architecture between traffic proxies and enabler servers. The capability broker may include a capability interface through which the traffic proxies and the enabler servers may communicate with each other by sending messages. In addition, the capability broker may include a service interface intended for service providers as well as an administrator interface intended for an administrator of the capability broker. The capability broker may be designed so that a service provider is able to obtain capabilities within its access rights. As an example, the service provider may request and obtain certain capabilities to distribute content messages to terminals.

The messaging system according to an embodiment of the invention may include the inventive capability broker. The messaging system may be adapted to form a distribution list. The distribution list may be intended for a content provider which is going to distribute content messages to its customers, but is not sure who of its customers are able to receive the content messages at the moment. As an example, first, a preliminary distribution list containing the all mobile phone numbers of the customer set is formed. Then such mobile phone numbers which are not possessed by any subscriber are removed from the preliminary distribution list. Also such mobile phone numbers which are possesses by subscribers currently roaming are removed from the list.

When the distribution list is ready, the messaging system may pass through the mobile phone numbers of the list and may query context information for each mobile phone number. This context information may be needed, for example, to form a content message to be distributed so that the content message can be successfully shown in a certain type of mobile phone. The context information may be stored in the enabler servers which are reachable through the operator's network.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention is described more closely with reference to the accompanying drawings, in which.

DETAILED DESCRIPTION OF THE INVENTION

Figure 1A:
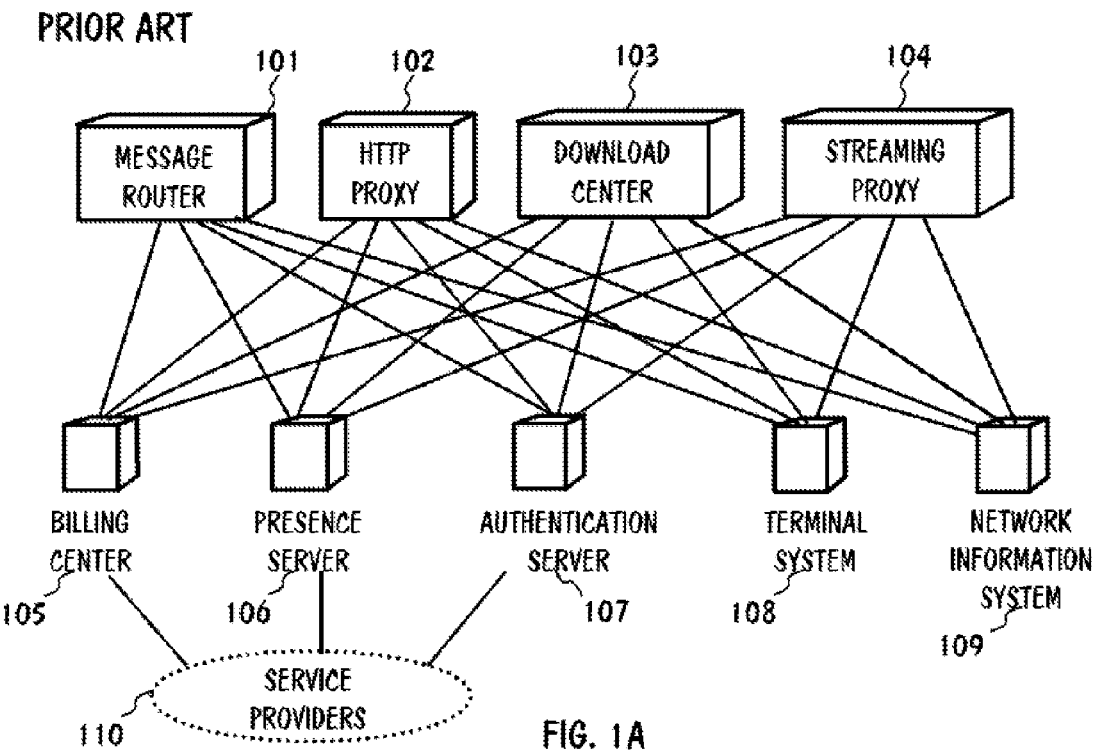
FIG. 1A shows an example of a network architecture.

The messy network architecture shown in FIG. 1A makes it difficult to open the operator's network for service providers.

Figure 1B:
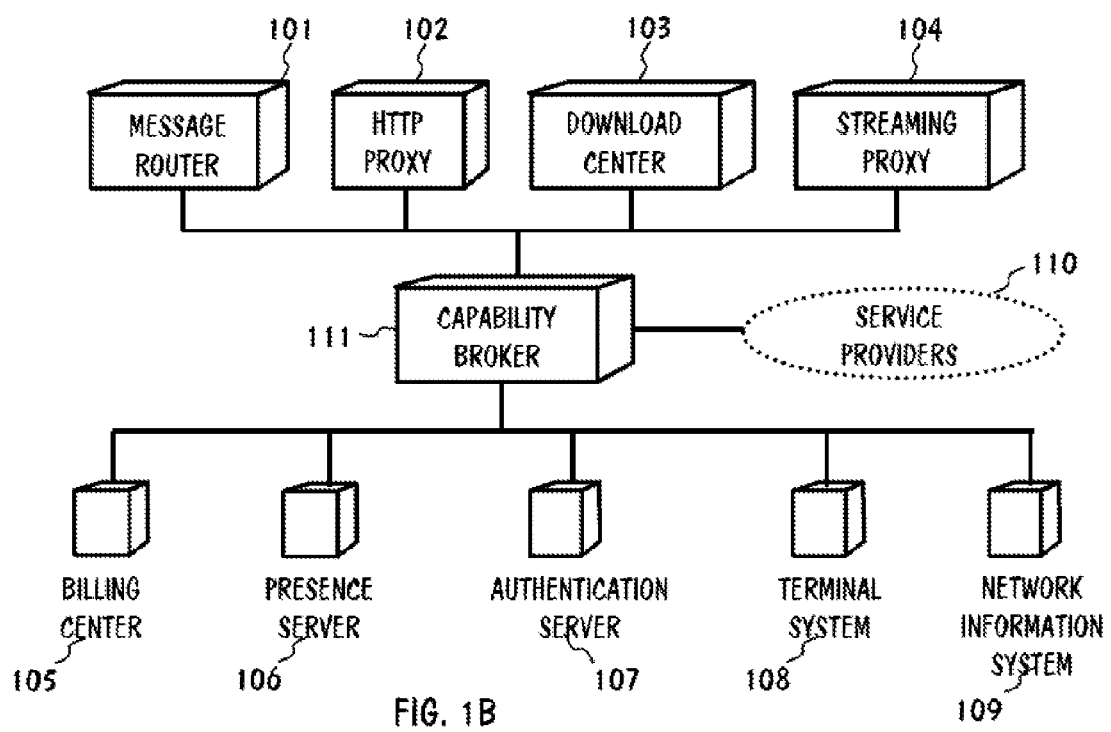
FIG. 1B shows a network architecture in accordance with an embodiment of the invention.

FIG. 1B shows a network architecture concerning the operator's network in accordance with an embodiment of the invention. The traffic proxies 101-104 and the enabler servers 105-109 are the same as in FIG. 1A.

A new kind of network element, i.e. a capability broker 111, is placed between the traffic proxies 101-104 and the enabler servers 105-109. The capability broker has just one capability interface which is intended for the all four traffic proxies 101-104. The same capability interface is intended to be used irrespective of which one of the five enabler servers 105-109 is to be accessed. In other words, the traffic proxies 101-104 may access the capabilities offered by the enabler servers 105-109 through just one capability interface instead of having to support different interface for each capability/enabler server like in prior art arrangements (e.g. FIG. 1A).

If the billing center 105 is replaced with a new one, the possible modifications in the capability interface of the billing center 105 need to be done only in the capability broker.

In addition, the capability broker 111 provides just one service interface for the service providers 110. This service interface replaces the three service interfaces shown in FIG. 1A. Logically this service interface may be different from the capability interface, but in practice the capability interface may be used as the service interface. That is, the capability broker may provide one interface that may be used by various network entities such as traffic proxies or service provider systems for accessing capabilities of the network.

Enabler servers 106-109 provide context data about terminal's, the users of the terminals, and the networks in which the terminals are operating. These enabler servers are discussed more closely.

The presence server 106 includes at least user-specific status data. The status data may disclose, for example, that a user is currently at work, in a meeting, or at home. In addition or alternatively, the status data may disclose that the user can be reached by email or by calling to a certain number. In addition or alternatively, the status data may disclose in which network the user is currently located. The network is, for example, a 2G or 3G network, or a WLAN, HSDPA, GPRS, or an EDGE network. The status data may be visible to another user, if he/she has a terminal capable to receive and show the status data. The status data may be used for multiple purposes, such as to share relevant information with other users, or to control services (for example, a service termed "Push To Talk"). Also devices, places, and other things may also have a presence, i.e. status data, which may be stored in the presence server 106.

The authentication server 107 provides at least authentication services. It usually uses one of the three main algorithms for authentication: passwords, Needham and Schroeder protocol (used in Kerberos), or public key encryption. In all of the main algorithms, the idea is to keep the secret information inside a secured environment. In addition to authentication, the authentication server 107 may provide authorization and accounting services. Then the server 107 can be termed as an AAA server. By using authorization a user can be authorized to use a certain service. Accounting can be used to collect statistical data, such as users' connection times. RADIUS (Remote Authentication Dial In User Service) is an AAA protocol for applications such as network access or IP mobility.

The terminal system 108 provides context data about terminals, such as terminal type and terminal capabilities and features. It may be a database or it may include a database. Also a HLR (home location register) can be considered as a part of the terminal system 108.

The network information system 109 is usually a proxy server through which network information can be requested and received. The network information discloses network-specific details which are needed, for example, in message traffic.

It must be noted that in addition to the shown enabler servers, the system may include other enabler servers as well.

It should noticed that FIG. 1B shows only few of the possible traffic proxies which can utilized in the invention. In addition to traffic proxies 101-104, the following traffic proxies may be usable through the operator's network: a message router, an HTTP proxy, a download center, a streaming proxy, an SMS gateway, an MMS gateway, an SMS direct delivery gateway, an MMS direct delivery gateway, a WAP gateway, a WAP push proxy, an I-mode gateway, an I-mode push proxy, an OTA device configuration system, a transcoding server, a transcoding proxy, a traffic optimisation server, a browsing accelerator, a traffic shaping server, a content rendering server, a content discovery portal, an application server, a content storage, a digital rights management server, a virus scanner, a content filtering server, an alert push server, a traffic throttling system, a traffic sniffer, a GGSN, a 3G GGSN, an instant messaging server, an IMS CSCF (Call Session Control Function), a media gateway, a mediation system, a traffic bus, a message bus, a push-to-talk server, a ring back tone server, and/or a portal server.

In the above, the words "server", "proxy", and "gateway" may be used interchangeably instead of each other.

Figure 2:
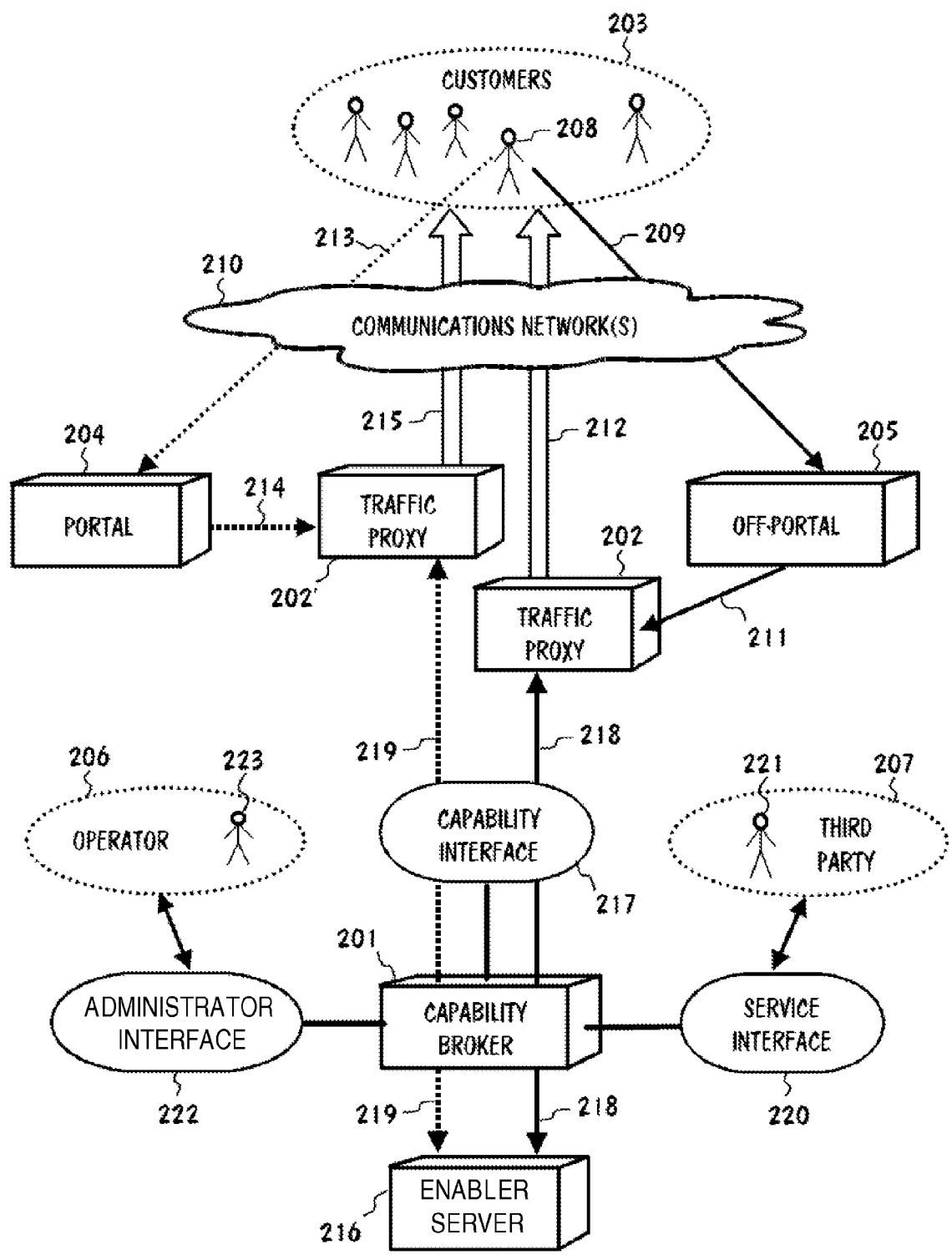
FIG. 2 illustrates the operation of a capability broker in an embodiment of the invention.

FIG. 2 illustrates the operation of the capability broker. In this use example the capability broker 201 assists traffic proxies, which are marked with 202 and 202'.

Customers 203 may use an off-portal 205, or in more specific, an off-portal application server, and a portal 204, or in more specific, a portal application server, to select and order content messages which interest them. Then the traffic proxies 202 and 202' transmit these content messages to the terminals of customers 203.

The portal 204 is administrated by an operator 206, and provides a certain content service. The other portal, i.e. the off-portal 205 providing another content service is running on a server administrated by a third party 207. FIG. 2 shows only one representative 207 of third parties, but there could be a number of third parties and a number of off-portals.

At first, we may assume that the traffic proxies 202 and 202' are the same device and that device is owned by the operator 206.

Let us assume that a customer 208 has a terminal and he/she uses the terminal to contact 209 the off-portal 205 via a communications network 210. The terminal may be a mobile phone and the communications network may be a mobile radio network.

When the customer 208 selects some content available through the off-portal 205, the off-portal initiates 211 a transmission 212 from the traffic proxy 202. This transmission 212 is composed of at least one content message.

The customer 208 receives the transmission 212 via the communications network 210 to the terminal and can then watch and/or listen the selected content.

Correspondingly, the customer 208 may browse 213 to the portal 204 to select some content. After the customer's selection the portal 204 initiates 214 a transmission 215. The customer 208 receives the transmission 215 at the terminal and can use the selected content.

The traffic proxy 202 may need support services/capabilities offered by an enabler server 216. Depending on the content service to be provided, the traffic proxy 202 may need these support services of the enabler server 216 before the transmission 212 or 215, during the transmission 212 or 215, and/or after the transmission 212 or 215.

A capability broker 201 is equipped with a capability interface 217 through which the traffic proxy 202 may access the capabilities offered by the enabler server 216 (and also capabilities offered by other enabler servers not shown in the figure). Logically the traffic proxy and the service enabler 216 communicate by sending and receiving messages through the capability interface 217. The messages that are sent and received through the capability interface are termed "capability messages". They essentially differ from the content messages to be sent to the customers 203. The capability messages are transmitted through the capability interface 217 in the operator's network. In practice the capability broker receives the capability messages and accordingly accesses the desired enabler server through the interface offered by that enabler server. On the basis of the information retrieved from the enabler server the capability broker then provides response to the capability messages through the capability interface. It must be noted that the capability broker may access one or more enabler servers in response to a single capability message.

The arrows 218 and 219 illustrate capability message-based communications between the traffic proxy 202 and the service enabler 215. Communication 218 is related to transmission 212 and the other communication 219 is related to the other transmission 215. One common message interface, i.e. the capability interface 217, simplifies substantially the control of the capability message-based communications.

The capability broker 201 is further equipped with a service interface 220 through which an employee 221 of the third party 207 is able to request the capabilities of the operator 206. We may assume that the third party 207 needs these capabilities to perform certain actions in the traffic proxy 202 and/or in the service enabler 216. In practice the capability interface may be used as the service interface, but logically thinking there may be two interfaces as the reason for requesting capability information may be different.

The capability broker 201 is further equipped with an administrator interface 222 through which an employee 223 of the operator 206 (i.e. an administrator) adjusts which actions the employee 221 of third party can perform in the traffic proxy 202 and/or in the enabler server 216.

In the above we have assumed that the traffic proxies 202 and 202' are the same device.

It is, however, possible that they are different devices so that the third party 207 owns the traffic proxy 202 and the operator 206 owns the other traffic proxy 202'. If so, the operator 206 shares the use of capability broker 201 and enabler server 216 with the third party 207, but does not share the use of the traffic proxy 202' with the third party 207.

In the above the traffic proxy 202 and the off-portal 205, i.e. the off-portal application server, are different devices.

It is, however, possible that the traffic proxy 202 is omitted. Then capability message-based communication 218 is directed to the off-portal 205 and the transmission 212 is from the off-portal 205.

Figure 3A:
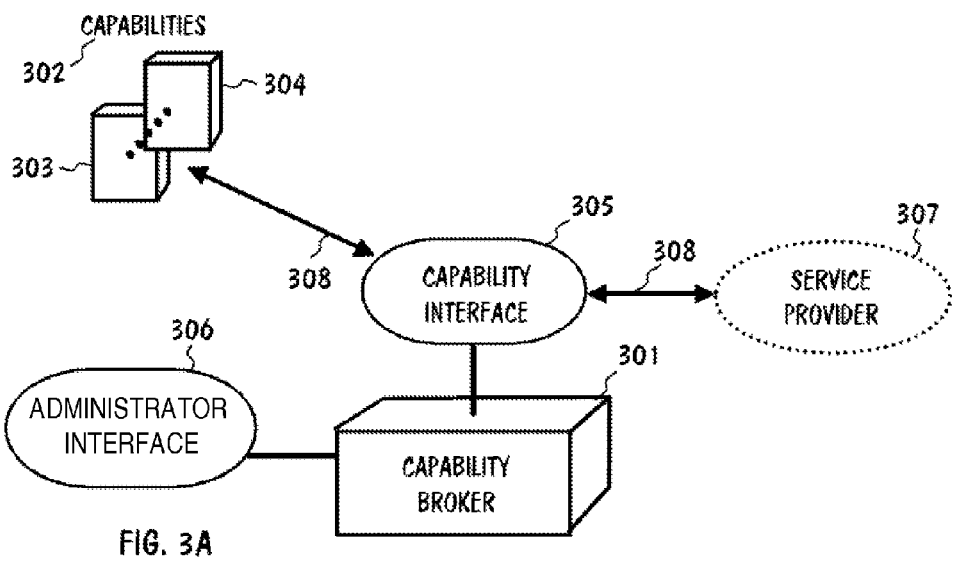
FIG. 3A shows a capability broker in accordance with an embodiment of the invention.

FIG. 3A shows a capability broker in accordance with an embodiment of the invention. In addition to content services, this capability broker 301 can be used in other types of services, too.

The capability broker 301 provides capabilities 302 of an operator of a communications network to service providers. The capabilities 302 are located in at least two enabler servers 303 and 304 in the operator's network. The enabler servers (303 and 304) may be different devices. Alternatively, the enabler servers (303 and 304) may be placed in the same equipment. The enabler servers related to the capability broker 301 enable the service providers to run services intended for their customers, that is, they provide capabilities that may be needed for providing certain services.

The capability broker 301 comprises memory capacity, processor capacity, an administrator interface 305, and a capability interface 306.

The interfaces 305 and 306 may be designed as follows.

An administrator of the capability broker 301 is able to grant through the administrator interface 306 the capabilities 302 to a certain service provider 307. The administrator of the capability broker is nominated by the operator. The service provider may represent a third party or the operator. In other words, the capability broker 301 may serve third parties as well as the operator.

The service provider 307 is able to use the granted capabilities through the capability interface 305 by sending capability messages 308 to the service enablers and/or by receiving capability messages 308 from the service enablers. For example, when the service provider 307 is granted the capability to use the billing center of the operator, the capability messages are sent to the billing center through the capability interface 305. Like mentioned above, in practice the capability broker receives the capability messages sent through the capability interface, uses interfaces offered by the enabler servers for accessing the desired enabler server(s) and then provides through the capability interface a response to the received capability message. In this way the service provider 307 (or the system of the service provider) does not need to know details of the interfaces of the service enablers. Herein it must be noted that the interface that is used by the capability broker for accessing the enabler servers does not need to be the same capability interface that is used by the service provider.

The capability interface 305 may be adapted to handle IMS (IP Multimedia Subsystem)-based communications. Then we may assume that the messages 308 are compliant to IMS. In more detail, the messages are formed in accordance with a protocol termed "session initiation protocol" (SIP).

The capability interface 305 of the capability broker 301 may support: a) IP multimedia subsystems (IMS), b) the IMS application server functionality (also termed SIP-AS), and c) the IMS service capability server functionality (also termed OSA-SCS).

In addition to IMS/SIP, or in place of IMS/SIP, the capability interface 305 may be adapted to handle SS7 (signalling system 7)-based communications.

The enabler servers may include one or more of the following equipments: a billing center, a presence server, an authentication server, a terminal system, a network information system.

The capabilities 302 may include one or more of the following capabilities.

A capability to use the authentication server.

A capability to use the presence server proving presence information about subscribers of the communications network. The presence information may disclose, for example, whether a certain terminal is connected to the network or not, the customer status such as "in meeting" or "on holiday", or the customer mood such as "happy" or "angry".

A capability to use the billing center to bill the subscribers.

A capability to use a terminal information server.

A capability to use a location system providing terminal location information.

A capability to use a system providing IP-number to MSISDN mapping and identifying whether a certain MSISDN belongs to a certain operator.

A capability to use a roaming information server which discloses whether the subscriber is roaming.

A capability to use a subscriber profile server. This server provides subscriber profiles each of which discloses, for example, a subscriber's gender, age, and service preferences.

A capability to use a subscription system providing information about certain subscriptions.

A capability to use an access control server hosting access control lists to certain network capabilities.

A capability to obtain technical information about characteristics of the communications network and its terminals. This technical information may be essential in a content service or in some other service of the service provider 307.

The last-mentioned capability may relate to use of a number of systems or servers.

Figure 3B:
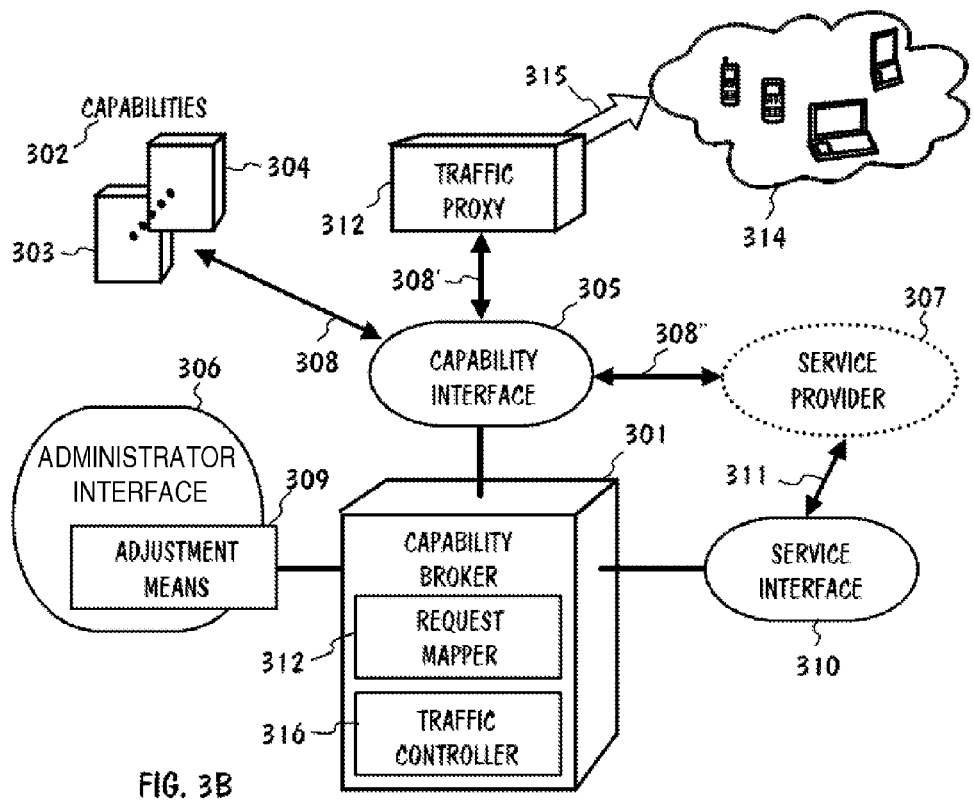
FIG. 3B shows additional features of a capability broker according to an embodiment of the invention.

FIG. 3B shows additional features of a capability broker according to an embodiment of the invention. The administrator interface 306 may be equipped with adjustment means 309 by which the administrator of the capability broker 301 is able to adjust the capabilities granted to the service provider. This adjustment of the capabilities means, for example, that the administrator specifies the magnitude or volume of each granted capability.

The administrator may specify that a service provider has read rights to a certain capability but not write rights. In addition or alternatively, the administrator may specify that the service provider can use the capability, for example, once a day.

Each service provider preferably has a service provider profile which discloses the granted capabilities. The administrator of the capability broker 301 may use the adjustment means 309 to create a service provider profile or to edit the created profile so that the profile discloses a) which capability/capabilities are currently granted to the service provider and b) the magnitude/volume of the capability/capabilities.

The profiles of the service providers may be stored in a service provider database that is accessible through the administrator interface 306.

The adjustment means 309 may further be adapted to deny access to certain customer-specific information obtainable through the capabilities 302. This feature is important, because the operator may not be allowed to provide some customer-specific information, such as the customer's name or location, to service providers without the customer's permission.

Each subscriber of the operator may have a customer profile which discloses the access rights to the customer-specific information. The administrator of the capability broker 301 may use the adjustment means 309 to create a customer profile or to edit the created profile so that the profile discloses a) which item(s) of the customer-specific information a certain service provider can obtain and b) limitations related to the item(s) of the customer-specific information. These limitations may be time-based, i.e. the certain service provider is allowed to use the item(s) of the customer-specific information during one month and/or the service provider is allowed to use the item(s) once a day.

The adjustment means 309 may further be adapted to set a price for a certain type of service request, internal request, or capability message. For example, a service request may cost 10 cents per a customer. The price of the service request may be service provider-specific. The terms "internal request" and "capability message" are discussed later on.

The capability broker 301 may further comprise a service interface 310 that may be designed as follows. Like mentioned above the service interface need not be a separate interface, instead the capability interface may be used as the service interface.

The service provider 307 is able to make a service request 311 through the service interface 310, the service request 311 concerning the use of the granted capabilities. For example, the service provider 307 can make a service request to obtain context information from the enabler servers. The form of a service request and a capability message may in fact be the same and the term service request and the term capability message may be used interchangeably.

If the capability broker 301 includes the service interface 310, the service provider 307 can request the capabilities through the service interface 310 and/or through the capability interface 305.

If service provider 307 requests the capabilities through the service interface 310, the requested capabilities may be sent through the service interface 310 to a server at which the service request was made. This option is illustrated with the arrow 311.

Alternatively, the requested capabilities may be sent through the capability interface 305 to a traffic proxy 312 administrated and/or owned by the service provider 307. This option is illustrated with the arrow 308'.

Alternatively, the requested capabilities may be sent through the capability interface 305 to another server administrated and/or owned by the service provider 307. This option is illustrated with the arrow 308".

If service provider 307 requests the capabilities through the capability interface 305, the requested capabilities are sent either to the traffic proxy 312 or the other server administrated and/or owned by the service provider 307. These options are illustrated with arrows 308' and 308".

The capability broker 301 may further comprise a request mapper 313 which is adapted to map the service request to one or more "internal requests" generated responsive to the service request. These internal requests are handled in the operator's network. In practice the internal request may be requests to obtain capabilities from one or more enabler servers. In other words, one may think that the internal requests logically correspond to capability messages or requests.

The service request may be a batch query which serves in one batch a number of customers. For example, the batch query may concern a certain capability of the operator and certain ten customers. Then the capability broker uses this certain capability when providing response to the service request and/or when serving the ten customers.

The service request may be a consolidated query concerning use of a number of capabilities. These capabilities are used during the execution of the consolidated query. For example, the consolidated query may use the terminal Information, the presence information, and the network type information.

The service request may be at the same time a batch query and a consolidated query.

The request mapper 313 may be adapted to map the service request 311 to one or more internal requests/capability messages generated responsive to the service request 311.

The known request mappers map requests to the results of the requests. The request mapper 313 performs this request-results mapping as well as the above-mentioned mapping between the service request and the internal request(s) generated responsive to it.

In addition, the request mapper 313 may map the service request to its maker, i.e. to a certain service provider. Then it is possible to determine on the basis of the mappings which service provider has initiated a certain internal request.

The request mapper 313 may be further adapted to write a notation to a transaction log for each service request and/or internal request, i.e. each request may cause a certain transaction and a notation to the transaction log. The notation written by the request mapper 313 discloses, for example,
1) the service provider that initiated a service request/an internal request,
2) the point of time of the initiation,
3) the sender of the internal request (a network element in the operator's network), and
4) the receiver/handler of the internal request (another network element in the operator's network).

The transaction log is useful when the operator wants to find out which transactions cause problems in use of the capabilities 302. The transaction log can also be used for tracking and identifying fraud transactions in the operator's network.

The transaction log can also be used in billing. As mentioned above, the adjustment means 309 can be adapted to set a price for a certain type of service request. Then it is possible to pass through the transaction log and calculate a number of the certain type of service requests which are made by a certain service provider, and after that, to multiply this number by the above-mentioned price. This calculation results in the total price to be billed from the service provider.

The request mapper 313 may be further adapted to operate as a programming tool by means of which a service provider (such as the service provider 307) is able to implement a new network service. In that case the service provider may define with the request mapper those internal requests which are to be generated as response to a certain service request.

As mentioned above, the granted capabilities may include a capability to obtain technical information about a communications network 314 and its terminals. This technical information is needed when sending content messages 315 from the traffic proxy 312 through the communications network 314 to the terminals.

The service provider may be able to form content messages on the basis of this technical information and distribute the content messages via a traffic proxy and the communications network to a set of the terminals.

Each of the capabilities 302 has a certain maximum volume. If one or more of these maximum volumes is exceeded, the use of the capabilities 302 is in some way interrupted. In order to prevent the interruptions, the capability broker 301 may further comprise a traffic controller 316.

The traffic controller 316 may be adapted to control the number of service requests. These service requests concern the use of the capabilities 302. The number of the requests is not allowed to exceed a certain limit during a certain time period.

The service requests are readable from the messages 311 which are received through the service interface 310 of the capability broker 301. Each service request is made by some service provider such as the service provider 307 and each service request generates at least one internal request concerning the use of the capabilities 302. For example, a service request may generate an internal request for using a billing center.

In addition or alternatively, the traffic controller 316 may be adapted to control the number of internal requests.

In addition or alternatively, the traffic controller 316 may be adapted to control the number of the capability messages transmitted through the capability interface 305.

The traffic controller 316 may be further adapted to set at least one throttle to limit the service requests and/or the internal requests. Each throttle may determine the maximum volume and/or the minimum volume for certain type of traffic.

We may consider that a throttle allows a certain volume to pass it and the throttle stops the traffic exceeding this certain volume. When the throttle stops the traffic, it may mean in practice that service requests and/or internal requests are discarded. Alternatively, the stopping of traffic may mean that the service requests and/or the internal requests are temporarily placed in a buffer.

For example, the following throttles or some combination of them can be used in the capability broker 301:
  a throttle for a number of service requests per hour,
  a throttle for a number of simultaneous service requests,
  a throttle for a number of service requests per a service provider,
  a throttle for a number of internal requests which are targeted to a billing center,
  a throttle specifying whether a certain service provider is allowed to use the billing center,
  a network element-specific throttle for the number of bytes per second (KB/s) to be received,
  a throttle for a number of subscribers which can be served by one service request,
  a throttle for a number of service requests which are targeted to a certain person within a certain time period, for example, the throttle may allow only one location query per day.

The throttles can be used in the traffic controller 316 as well as in the adjustment means 309. The administrator can set through the adjustment means 309 a single throttle or a set of throttles to specify the magnitude or volume of a certain capability.

As an example, the administrator may set throttles that specify guaranteed throughput for a certain type of requests. This guaranteed throughput is a service provider-specific limit disclosing the minimum volume of requests per second. The service provider must pay for its service requests and/or the internal request generated due to the service requests, thus the operator should provide a certain guaranteed throughput for the service provider's requests.

In order to protect the network elements against overloading, it is recommended to set at least one throttle for each network element. The elements 101-109 in FIG. 1B are some examples of the network elements. The throttles should prevent congestion and possible overload errors in the messaging system composed of the network elements.

The traffic controller 316 may be further adapted to write markings to a transaction log. The traffic controller 316 may be further adapted to read the transaction log in order to make statistics about the service requests, the internal requests, and/or the capability messages. These statistics concern at least the numbers of the requests and they disclose average traffic per hour. They may also disclose points of time related to traffic peaks, failure rates, or any other result that can be determined on the basis of the markings of the transaction log.

The statistics are useful, for example, when updating the throttles. The operator may need new throttles and some existing throttles may need to be modified or removed.

FIG. 3B shows that the traffic proxy 312 and the capabilities 302 are located in different servers. However, it possible that the same server operates as the traffic proxy 312 and also provides at least one of the capabilities 302. The common message interface, i.e. the capability interface 305, may enable that the traffic proxy 312 and the capabilities 302 can be freely located in one or more servers in the operator's network.

The interfaces 306 and 310 can be implemented in various ways, but certain features are recommendable.

The administrator interface 306 and the service interface 310 may be easy-to-use graphical user interfaces (GUI). The access control related to these interfaces 306 and 310 may be based on a user identifier and a password, but other access control methods can be used, too.

The interfaces 306 and 310 may be industry standard interfaces and compliant to service oriented architecture (SOA), Parlay X, and/or Parlay/OSA (defined by the Parlay Group).

The interfaces 306 and 310 can be implemented so that they are used to through an Internet browser. In other words, the interfaces may be web-based. Alternatively, the interfaces 306 and 310 can be implemented using known programming tools as API (Application Programming Interface) interfaces. If needed, these API interfaces can be integrated to GUI systems.

A messaging system in accordance with an embodiment of the invention comprises at least the capability broker 301.

Let us assume that the administrator of the capability broker 301 grants capabilities to a content provider. These granted capabilities enable forming of messages and/or sending of the messages. In addition or alternatively, the granted capabilities enable sending of the messages through a traffic proxy to a set of terminals which are connected to the communications networks of the operator.

The messaging system in accordance with an embodiment of the invention may be adapted to receive from the content provider a service request concerning a distribution list. The messaging system may be further adapted to form the distribution list containing terminals to which content messages of the content provider are to be distributed and to send the distribution list to the content provider.

The messaging system may be further adapted to use the capabilities available through the capability broker before distribution of the content messages, during said distribution, and/or after said distribution and/or for forming the distribution list.

The messaging system may further comprise equipment to which the distribution list is sent. This equipment may be adapted to distribute the content messages to the terminals mentioned in the distribution list.

Figure 4:
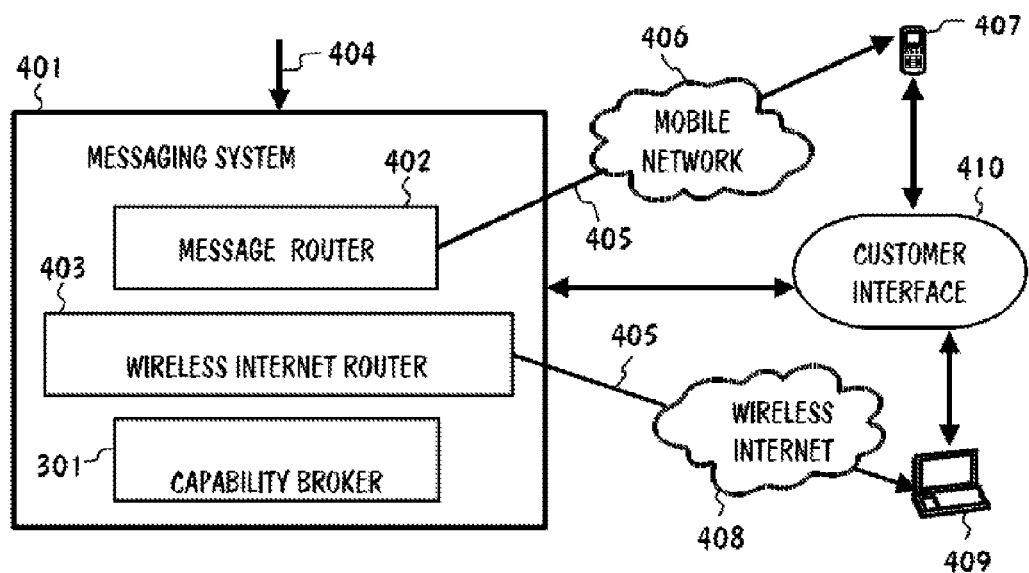
FIG. 4 shows an embodiment of a messaging system.

FIG. 4 shows an embodiment of a messaging system. In addition to the capability broker 301, the embodiment 401 of the messaging system further comprises a message router 402 and/or a wireless Internet router 403.

The message router 402 is adapted to distribute content messages 405 via a mobile network 406. Correspondingly, the wireless Internet router 403 is adapted to distribute the content messages 405 via the wireless Internet 408. The content messages 405 are usually distributed in different format to a terminal 407 of the mobile network and to a terminal 409 of the wireless Internet 408.

The embodiment 401 of messaging system further comprises a customer interface 410 though which the messaging system is adapted to receive technical characteristics of the terminals.

The customer interface 410 can be implemented so that each time when a terminal (e.g. the terminal 407 or 409) connects to a network (for example, to the mobile network 406 or to the wireless Internet 408), the terminal sends its type and other relevant technical characteristics to the messaging system. These technical characteristics are preferably stored in an enabler server accessible through the capability broker 301. Then the capabilities available through the capability broker 301 include the capability to obtain technical information about characteristics of the communications network and its terminals.

Alternatively, the customer interface may be implemented so that a customer having a terminal (e.g. the terminal 407 or 409) writes through the customer interface the technical characteristics of his/her terminal, i.e. the implementation of the customer interface is, for example, WWW-based.

Figure 5:
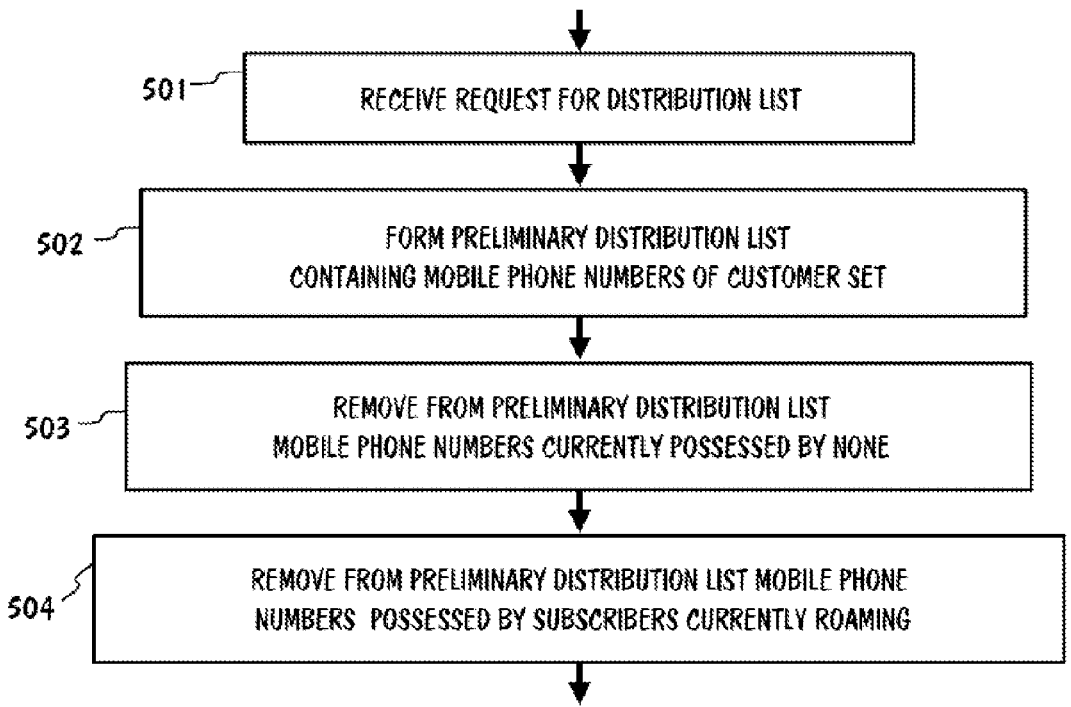
FIG. 5 shows a method for forming a distribution list according to an embodiment of the invention.

FIG. 5 shows a method for forming a distribution list according to an embodiment of the invention. This distribution list contains mobile phone numbers to which content messages of a service provider are to be sent. The method comprises the following steps to be performed in a messaging system.

Receive 501 a request for the distribution list. This request determining a customer set is sent from the service provider.

Form 502 a preliminary distribution list containing mobile phone numbers of the customer set.

Remove 503 from the preliminary distribution list such mobile phone numbers which are as yet possessed by no subscriber. In other words, those mobile phone numbers are invalid, for example, because the subscribers who have possessed the numbers have changed their operator and their mobile phone numbers.

Remove 504 from the preliminary distribution list such mobile phone numbers which are possesses by subscribers currently roaming. The roaming causes additional costs which are usually targeted to a receiver of a content message, i.e. to a certain subscriber. Therefore we may assume that the receiver don't want to receive the content message when he/she is roaming. The step 504 results in the distribution list containing the mobile phone numbers to which the content messages are to be sent.

The messaging system or the capability broker in accordance with various embodiments of the invention may be adapted to perform the above-mentioned steps 501-504.

The method may further comprise an additional step of removing from the preliminary distribution list the mobile phone numbers of such terminals which are incapable to receive the content messages due to their technical implementation. In other words, the terminals of "wrong" types are not able to process the content messages. For example, a terminal may be capable to receive an SMS message, but not a multimedia message (e.g. an MMS message).

The messaging system or the capability broker in accordance with various embodiments of the invention may be adapted to perform this additional step before the step 504.

The method may further comprise another additional step of removing from the preliminary distribution list the mobile phone numbers of such terminals which are mentioned in a black list. The black list discloses, for example, the numbers of the customers who have financial difficulties.

The messaging system or the capability broker in accordance with various embodiments of the invention may be adapted to perform this other additional step before the step 504.

Additionally or alternatively, the messaging system or the capability broker in accordance with various embodiments of the invention may optionally add "customer context information" to the distribution list.

The customer context information may include one more items of information available by using the capabilities 302, such as the terminal information, the network information, the customer profile, the customer presence or some other customer specific information.

EXAMPLES

The following three examples illustrate how the invention can be utilised.

A first example concerns a taxi company. Let us assume that the taxi company owns a server which is capable of communicating with the capability broker. This server requests from the capability broker the current locations of the taxi company's taxies. The request may be sent for example through the service interface of the capability broker.

A second example concerns advertising. Let us assume that a supermarket wants to promote new products and a representative of the super market contacts a service provider. The service provider is committed to promote the new products using a content service.

The content service sends a request for a distribution list to a capability broker. The capability broker is adapted to perform the inventive method. Therefore it forms the distribution list.

Then the content service sends another request according to which the distribution list should be focused on customers living on a certain geographical area close enough to the super market. Thus, the capability broker removes from the distribution list the customers living outside of this certain area. For finding out the information needed for forming the distribution list (e.g. for knowing where each customer lives), the capability broker uses its readily available access to capabilities offered by various enabler servers.

Alternatively the content service may send just one request requesting a distribution list focused on customers living on the certain geographical area. That is, it is not mandatory to have two requests.

In an equivalent manner the capability broker may receive request for a distribution list of customers fulfilling any desired criteria, for example customers that are under 20 years old and live in a certain city. The capability broker sends necessary queries for example to a customer profile system and a location system for finding out which customers fulfil the desired criteria and then form the requested distribution list.

The content provider sends a service request to the capability broker. The service request concerns certain capabilities which the content provider needs to distribute multimedia messages to the customers referred on the distribution list. We may assume that these multimedia messages advertise the new products.

The capability broker checks the terminal types and the network types related to the distribution list. The capability broker forms the content messages so that the terminals mentioned in the distribution list are able to receive the content messages. Finally, a certain messaging system that includes the capability broker sends the content messages to the terminals. It must be noted that the capability broker is not necessarily involved in the actual modification of content messages or sending or distributing the messages to the terminals. Instead the capability broker may just provide an interface for obtaining information that is needed for these actions.

A third example concerns off-portal billing. Let us assume that the capability broker provides the billing capability and a content provider offers downloading of games. In more detail, the games are downloadable from the content provider's server running an off-portal.

In addition, let us assume that a customer wants to purchase one of the games and he/she pushes the purchase button of the off-portal.

Then the off-portal requests the customer to confirm the purchase. After the customer has confirmed the purchase, the off-portal sends a "check balance" request to the capability broker. The content provider uses for example the customer's IP number as an identifier.

The capability broker first checks the MISISDN corresponding the customer's IP number. Then it checks whether the customer is a pre-paid or post-paid customer.

If the customer is a post-paid customer the capability broker sends immediately "OK" to the content provider.

If the customer is a pre-paid customer, the capability broker checks the balance of the customer's account. If the account contains enough money, the capability broker makes a reservation to the pre-paid system and sends the "OK" message to the content provider's server.

The content provider allows the customer to download the game.

After the download has finished, the content provider's server sends a delivery status message to the capability broker.

The capability broker receives the delivery status message. If the customer is a post-paid customer, the capability broker writes a CDR. Otherwise, the capability broker commits the billing transaction in the pre-paid system for the pre-paid customer.

Figure 6:
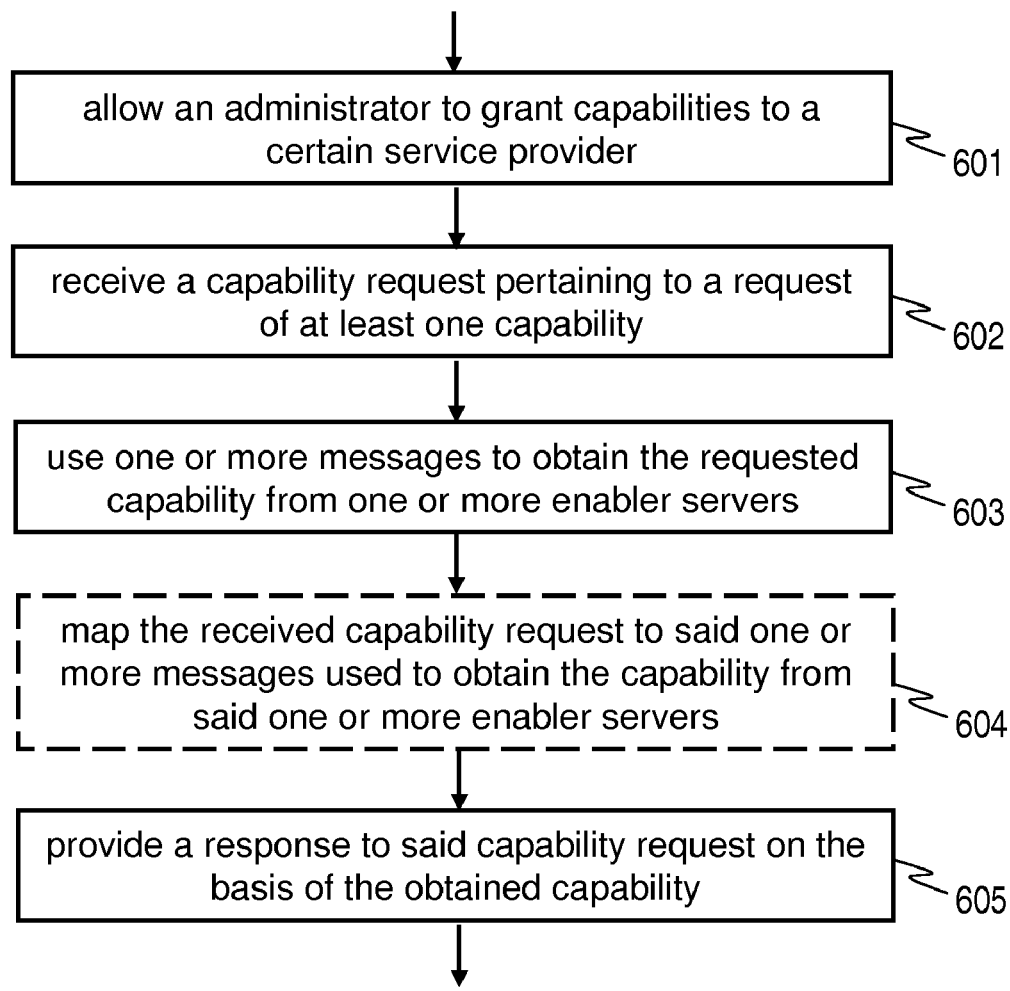
FIG. 6 illustrates a method according to an embodiment of the invention.

FIG. 6 illustrates a method according to an embodiment of the invention. The method is to be conducted in a capability broker. In step 601 of the method an administrator is allowed to grant capabilities to a certain service provider, the administrator being nominated by the operator. In step 602 a capability request pertaining to a request of at least one capability is received. In various embodiments of the invention the capability request may be a capability message or a service request discussed above.

In response to the capability request one or more messages are used in step 603 to obtain the requested capability from one or more enabler servers. In some embodiments of the invention the messages used to access the enabler servers may be internal requests discussed above. Then in step 605 a response to said capability request is provided on the basis of the obtained capability.

Additionally, in step 604 (shown with dashed line) the received capability request may be mapped to said one or more messages used to obtain the capability from said one or more enabler servers. The mapping may be conducted for example in the request mapper discussed above. The request mapper may be a system that receives as input the responses received from the one or more enabler servers and forms a response to capability request on the basis of these responses. Forming of the response may be conducted for example by means of generic program logic. One may think that the information from the step 603 is provided as input to the request mapper and the request mapper provides the response need in the step 605 as an output.

Herein it must be noted that the order of the steps of the methods of various embodiments of the invention may differ from the shown order. Additionally some of the shown steps may be repeated plurality of times and some of the steps may be left out.

The capability broker and the methods of various embodiments of the invention may be implemented by means of a computer program running on a suitable hardware platform or by means of any other suitable combination of hardware, software, special purpose circuits and/or logic. The capability broker may be for example a software process running on a general purpose computer or server.

Figure 7:
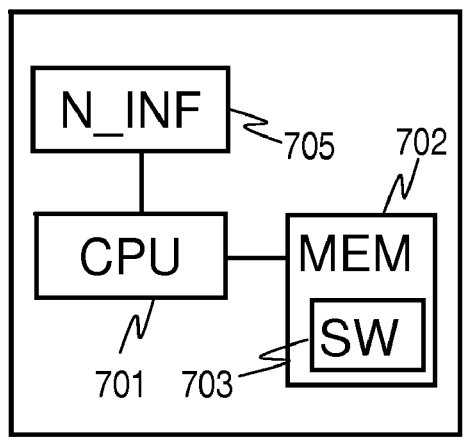
FIG. 7 shows a block diagram of an apparatus suited for implementing various embodiments of the invention.

FIG. 7 shows a block diagram of an apparatus 700 suited for implementing various embodiments of the invention. The apparatus 700 may be a typical computer, such as a general-purpose computer or a server, with possibly distributed functions. The apparatus comprises a central processing unit (CPU) 701 for controlling the apparatus and a memory 702 including a computer program code or software 703. The CPU 701 may be the processor capacity and the memory 702 may be the memory capacity discussed above for example in connection with FIGS. 3A and 3B.

The software 703 includes instructions for the CPU 701 to control the apparatus 700 such as an operating system and different computer applications. The software 703 may comprise instructions for controlling the apparatus to provide some functionality of the invention. The instructions may for example control the apparatus to operate as a capability broker according to some embodiments of the invention. The apparatus 700 further comprises a network interface (N_INF) 705 such as a LAN (Local Area Network), Ethernet or WLAN (Wireless LAN) interface. It must be noted that the network interface 705 is a physical interface, whereas various other interfaces, such as the capability interface and the administration interface are typically software interfaces. The messages relating to various different software interfaces are typically transferred through the same physical network interface. It is however possible that there are also separate physical interfaces. In addition to the shown components the apparatus 700 may comprise other components as well.

Some of the above examples concern service requests, some internal requests and some capability messages (which may essentially be requests). It must be noted that an example discussed in connection with one type of request may apply to other requests as well. For example, the throttles and the logging discussed in connection with the service requests may be applied to requests contained in capability messages as well.

In addition to the descriptions and the examples shown above the capability broker, the messaging system, and the method in accordance with various embodiments of the invention can be implemented in various ways which are, however, obvious to a person skilled in the art because of the person's professional ability and the ideas described in this patent application.

The invention is defined in the following claims.

The invention claimed is:

1. A capability broker for providing capabilities of an operator of a communications network, the capabilities being situated in enabler servers in the operator's network, the capability broker comprising:
   memory;
   processor;
   an administrator interface through which an administrator of the capability broker is able to grant capabilities to a certain service provider, the administrator of the capability broker being nominated by the operator; and,
   a capability interface adapted to receive a capability request pertaining to a request
   of at least one capability;
   the processor being adapted
      to use one or more messages to obtain the requested at least one capability from one or more enabler servers responsive to receiving the capability request; and,
      to provide a response to the capability request on the basis of the obtained capability;
   wherein the capability broker further comprises a request mapper adapted to map the received capability request to the one or more messages used to obtain the capability from the one or more enabler servers, and to map the results of the request obtained from the one or more enabler servers to the capability request.

2. The capability broker as in claim 1, wherein the capability interface is adapted to handle IMS (IP Multimedia Subsystem)-based communications.

3. The capability broker as in claim herein the capabilities include at least one of the following capabilities:
   a capability to obtain technical information about characteristics of the communications network and its terminals;
   a capability to use an authentication server;
   a capability to use a presence server proving presence information about subscribers of the communications network;
   a capability to use a billing center to bill the subscribers;
   a capability to use a terminal information server;
   a capability to use a location system providing terminal location information;
   a capability to use a system providing IP-number to MSISDN mapping;
   a capability to use a roaming information server which discloses whether the subscriber is roaming;
   a capability to use a subscriber profile server;
   a capability to use a subscription system providing information about certain subscriptions; and,
   a capability to use an access control server hosting access control lists to certain network capabilities.

4. The capability broker as in claim 1, wherein the granted capabilities enable an act selected from a group consisting of forming of messages, sending of the messages, and a combination thereof.

5. The capability broker as in claim 4, wherein the granted capabilities enable sending of the messages through a traffic proxy to a set of terminals which are connected to the communications networks.

6. The capability broker as in claim 5, wherein the traffic proxy is one of the following equipment: a message router, an HTTP proxy, a download center, a streaming proxy, an SMS gateway, an MMS gateway, an SMS direct delivery gateway, an MMS direct delivery gateway, a WAP gateway, a WAP push proxy, an I-mode gateway, an I-mode push proxy, an OTA device configuration system, a transcoding server, a transcoding proxy, a traffic optimisation server, a browsing accelerator, a traffic shaping server, a content rendering server, a content discovery portal, an application server, a content storage, a digital rights management server, a virus scanner, a content filtering server, an alert push server, a traffic throttling system, a traffic sniffer, a GGSN, a 3G GGSN, an instant messaging server, an IMS CSCF (Call Session Control Function), a media gateway, a mediation system, a traffic bus, a message bus, a push-to-talk server, a ring back tone server, and a portal server.

7. The capability broker as in claim 1, wherein the administrator interface is equipped with adjuster module configured to enable the administrator of the capability broker to adjust the capabilities granted to the service provider.

8. The capability broker as in claim 7, wherein the adjuster module is adapted to deny access to certain customer-specific information.

9. The capability broker as in claim 7, wherein the adjuster module is adapted to create a customer profile that discloses which item(s) of the customer-specific information a certain service provider is able to obtain.

10. The capability broker as in claim 9, wherein the customer profile further discloses time-based limitations related to use of the item(s) of information.

11. The capability broker as in claim 1, wherein the capability broker further comprises a service interface adapted to receive a capability request pertaining to a request of at least one capability.

12. The capability broker as in claim 1, wherein the capability request is a batch query which serves in one batch a number of customers.

13. The capability broker as in claim 1, wherein the capability request is a consolidated query concerning use of a number of capabilities.

14. The capability broker as in claim 1, wherein the request mapper is further adapted to operate as a programming tool by means of which the service provider is able to implement a new service.

15. The capability broker as in claim 1, wherein the capability broker further comprises a traffic controller which is adapted to perform an act selected from a list consisting of:
controlling a number of capability requests;
controlling a number of the messages used to obtain capabilities from the one or more enabler servers; and, a combination thereof.

16. The capability broker as in claim 15, wherein the traffic controller is further adapted to set a price for a certain type of capability request.

17. The capability broker as in claim 15, wherein the traffic controller is further adapted to set at least one throttle to limit the capability requests.

18. The capability broker as in claim 15, wherein the traffic controller is further adapted to set at least one of the following throttles:
a throttle for a number of capability requests per hour;
a throttle for a number of simultaneous capability requests;
a throttle for a number of capability requests per a service provider;
a throttle for a number of messages which are targeted to a billing center;
a throttle specifying whether a certain service provider is allowed to use the billing center;
a network element-specific throttle for the number of bytes per second to be received;
a throttle for a number of subscribers which can be served by one capability request; and,
a throttle for a number of capability requests which are targeted to a certain person within a certain time period.

19. The capability broker as in claim 15, wherein the traffic controller is further adapted to write a transaction log.

20. The capability broker as in claim 19, wherein the traffic controller is further adapted to read the transaction log in order to make statistics about the capability requests.

21. The capability broker as in claim 1, wherein the capability broker is further adapted:
to receive a request for a distribution list of terminals fulfilling certain criteria;
to access one or more enabler servers to find out which terminals fulfil the criteria; and,
to form the requested distribution list.

22. The capability broker as in claim 21, wherein a distribution request specifies a preliminary distribution list containing mobile phone numbers, and wherein the capability broker is further adapted to:
remove from the preliminary distribution list such mobile phone numbers which are as yet possessed by no subscriber; and, remove from the preliminary distribution list such mobile phone numbers which are possesses by subscribers currently roaming.

23. The capability broker as in claim 21, wherein the capability broker is further adapted to add customer context information to the distribution list.

24. A method for providing capabilities of an operator of a communications network, the capabilities being situated in enabler servers in the operator's network, the method comprising the steps of:
allowing an administrator to grant capabilities to a certain service provider, the administrator being nominated by the operator;
receiving a capability request pertaining to a request of at least one capability;
responsive to receiving the capability request, using one or more messages to obtain the requested at least one capability from one or more enabler servers;
mapping the received capability request to the one or more messages used to obtain the capability from the one or more enabler servers, and to map the results of the capability request, obtained from the one or more enabler server, to the capability request; and,
providing a response to the capability request on the basis of the obtained capability.

25. The method as in claim 24, wherein the capability messages are IMS (IP Multimedia Subsystem)-based communications.

26. The method as in claim 24, wherein the method further comprises allowing the administrator of the capability broker to adjust the capabilities granted to the service provider.

27. The method as in claim 24, wherein the method further comprises allowing the administrator of the capability broker to deny access to certain customer-specific information.

28. The method as in claim 24, wherein the method further comprises allowing the administrator of the capability broker to create a customer profile that discloses item(s) of the customer-specific information available to a certain information provider.

29. The method as in claim 24, wherein the capability request is a batch query for serving in one batch a number of customers.

30. The method as in claim 24, wherein the capability request is a consolidated query concerning use of a number of capabilities.

31. The method as in claim 24, wherein the method further comprises
performing an act selected from a list consisting of:
controlling a number of capability requests;
controlling a number of the messages used to obtain capabilities from the one or more enabler servers; and,
a combination thereof.

32. The method as in claim 31, wherein the method further comprises setting a price for a certain type of capability request.

33. The method as in claim 31, wherein the method further comprises setting at least one throttle to limit the capability requests.

34. The method as in claim 31, wherein the method further comprises writing a transaction log.

35. The method as in claim 24, wherein the method further comprises;
receiving a request for a distribution list of terminals fulfilling certain criteria;
accessing one or more enabler servers to find out which terminals fulfil the criteria; and,
forming the requested distribution list.

36. The method as in claim 35, wherein a distribution request specifies a preliminary distribution list containing mobile phone numbers, and wherein the method further comprises:
removing from the preliminary distribution list such mobile phone numbers which are as yet possessed by no subscriber; and,
removing from the preliminary distribution list such mobile phone numbers which are possesses by subscribers currently roaming.

37. The method as in claim 35, wherein the method further comprises adding customer context information to the distribution list.

38. A hardware memory medium comprising computer executable program code adapted to enable an apparatus to perform, when executed by a computer, providing capabilities of an operator of a communications network, the capabilities being situated in enabler servers in the operator's network, the program comprising:
computer program code configured to cause the computer to allow an administrator to grant capabilities to a certain service provider, the administrator being nominated by the operator; and,
computer program code configured to cause the computer to receive a capability request pertaining to a request of at least one capability;
computer program code configured to cause the computer responsive to receiving the capability request to use one or more messages to obtain the requested at least one capability from one or more enabler servers; and,
mapping the received capability request to the one or more messages used to obtain the capability from the one or more enabler servers, and mapping the capability obtained from the one or more enabler servers to the capability request; and,
providing a response to the capability request on the basis of the obtained capability.

* * * * *